US012381632B2

United States Patent
Pang et al.

(10) Patent No.: US 12,381,632 B2
(45) Date of Patent: Aug. 5, 2025

(54) WAVEGUIDE DELAY BASED EQUALIZATION WITH CURRENT SUMMING IN A DIFFERENTIAL TRANSIMPEDANCE AMPLIFIER

(71) Applicant: Cisco Technology, Inc., San Jose, CA (US)

(72) Inventors: Simon S. Pang, San Diego, CA (US); Wei Li, San Diego, CA (US)

(73) Assignee: Cisco Technology, Inc., San Jose, CA (US)

( * ) Notice: Subject to any disclaimer, the term of this patent is extended or adjusted under 35 U.S.C. 154(b) by 167 days.

(21) Appl. No.: 18/170,326

(22) Filed: Feb. 16, 2023

(65) Prior Publication Data

US 2024/0121009 A1    Apr. 11, 2024

Related U.S. Application Data

(60) Provisional application No. 63/378,608, filed on Oct. 6, 2022.

(51) Int. Cl.
*H04B 10/69*     (2013.01)
*H04B 10/61*     (2013.01)

(52) U.S. Cl.
CPC ....... *H04B 10/6971* (2013.01); *H04B 10/612* (2013.01)

(58) Field of Classification Search
CPC ................ H04B 10/6971; H04B 10/612
See application file for complete search history.

(56) References Cited

U.S. PATENT DOCUMENTS

| | | | | |
|---|---|---|---|---|
| 5,331,452 | A | * | 7/1994 | Smyth ............... H04B 10/67 398/1 |
| 11,323,185 | B2 | | 5/2022 | Pang et al. |
| 2008/0219680 | A1 | * | 9/2008 | Omori ............ H04B 10/677 398/9 |
| 2013/0028596 | A1 | * | 1/2013 | Suzuki ........... H04B 10/6931 398/209 |
| 2014/0205300 | A1 | * | 7/2014 | Hemenway, Jr. .. H04B 10/2581 398/116 |
| 2015/0311982 | A1 | | 10/2015 | Georgas et al. |
| 2017/0093349 | A1 | * | 3/2017 | Elliott ............. H03F 1/0233 |
| 2018/0006731 | A1 | * | 1/2018 | Pang .............. G02F 1/225 |
| 2018/0292682 | A1 | | 10/2018 | Dupuis et al. |
| 2019/0049666 | A1 | | 2/2019 | Welch |
| 2019/0052370 | A1 | * | 2/2019 | Pang .............. H04B 10/25 |
| 2019/0212496 | A1 | | 7/2019 | Karimelahi et al. |
| 2020/0014566 | A1 | | 1/2020 | Ahmed et al. |
| 2020/0162170 | A1 | * | 5/2020 | Pang ............ H04B 10/25891 |
| 2021/0126594 | A1 | | 4/2021 | Lambrecht et al. |

* cited by examiner

*Primary Examiner* — Pranesh K Barua
(74) *Attorney, Agent, or Firm* — Patterson + Sheridan, LLP

(57) ABSTRACT

A waveguide delay-based equalization (WDEQ) system is described. The WDEQ system provides a delay in waveguides of the system and electrical signal summing in a differential transimpedance amplifier (TIA) which increases the performance (e.g., bandwidth, etc.) of the optical receiver. The WDEQ system includes an optoelectronic circuit with a directional coupler, a first photodetector, at least two transistors connected to the first photodetector, an optical delay, and a differential transimpedance amplifier (TIA).

20 Claims, 6 Drawing Sheets

WAVEGUIDE DELAY BASED EQUALIZATION WITH CURRENT SUMMING IN A DIFFERENTIAL TRANSIMPEDANCE AMPLIFIER

CROSS-REFERENCE TO RELATED APPLICATIONS

This application claims benefit of U.S. provisional patent application Ser. No. 63/378,608 filed Oct. 6, 2022. The aforementioned related patent application is herein incorporated by reference in its entirety.

TECHNICAL FIELD

Embodiments herein relate to optical delay mechanisms in optoelectronic devices. More specifically, certain embodiments of the disclosure relate to optical waveguide delay based equalization with signal summing at a differential transimpedance amplifier in optical communication.

BACKGROUND

In optical receivers in optical communication networks, equalization is a common technique to improve overall performance of the receiver while receiving optical transmissions. As speed and bandwidth of optical communication networks increase, the expected bandwidths of optical receivers reach higher and higher speeds (e.g., 200 gigabits per second (Gb/s), 400 Gb/s and beyond). With the increased speeds, the ability to utilize previous equalization techniques in digital signal processing and voltage domains becomes more difficult due to power and performance requirements.

In some examples, waveguide delay-based equalization (WDEQ) may achieve the desired equalization by delaying optical signals using waveguides. While WDEQ systems provide equalization, they are difficult to implement for some advanced circuit architectures that are used in high speed optical communication networks.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
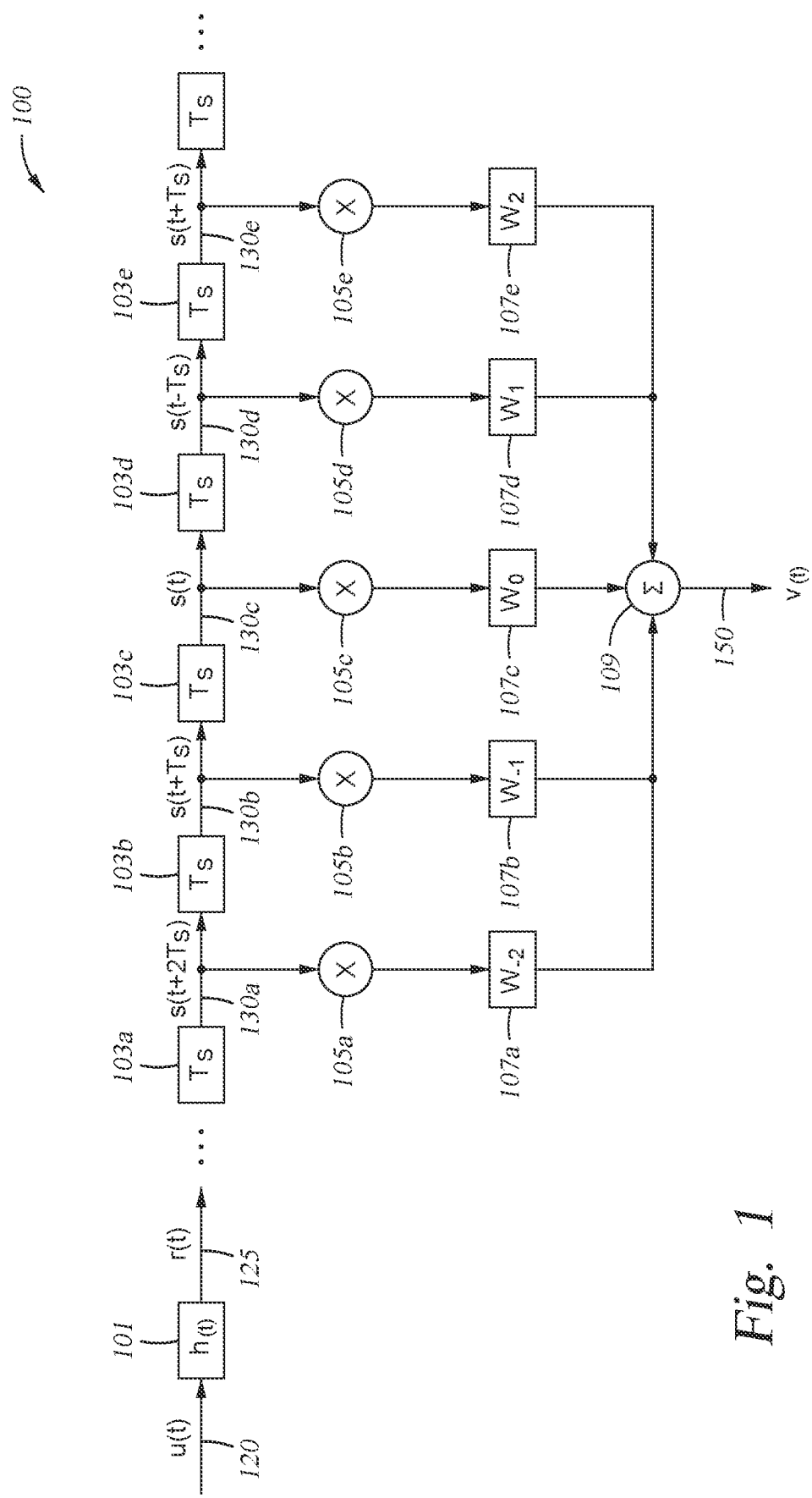
FIG. 1 illustrates an example equalizer, according to embodiments herein.

One general aspect includes a method. The method includes receiving an input optical signal and splitting the input optical signal into a first optical signal and a second optical signal. The method also includes delaying the first optical signal and converting the delayed first optical signal to a first electrical signal using a first photodetector and at least two transistors connected to the first photodetector. The method also includes converting the second optical signal to a second electrical signal using a second photodetector and at least two transistors connected to the first photodetector and a differential transimpedance amplifier (TIA). The method also includes summing the first and second electrical signals using the differential TIA.

One general aspect includes a system for communication. The system includes an optoelectronic circuit which includes a directional coupler, a first photodetector, at least two transistors connected to the first photodetector, an optical delay, and a differential transimpedance amplifier (TIA). The optoelectronic circuit being operable to: receive an input optical signal, split the input optical signal into a first optical signal and a second optical signal via the directional coupler, delay the first optical signal via the optical delay, convert the delayed first optical signal to a first electrical signal using the first photodetector, convert the second optical signal to a second electrical signal using a second photodetector with at least two transistors connected to the second photodetector and the differential TIA, and sum the first and second electrical signals using the differential TIA.

One general aspect includes a method. The method includes receiving an input optical signal. The method also includes splitting the input optical signal into a first optical signal and a second optical signal. The method also includes converting the first optical signal to a first electrical signal using a first photodetector with at least two transistors connected to the first photodetector and converting the second optical signal to a second electrical signal using a second photodetector with at least two transistors connected to the second photodetector and a differential transimpedance amplifier (TIA). The method also includes summing the first and second electrical signals using the differential TIA.

Example Embodiments

In optoelectronic or photonic devices, optical signals are often received from optical fibers and coupled into the device using a receiver. In some examples, performance (e.g., speed/bandwidth) of the receiver and overall device may be limited by various factors including Inter-symbol Interference (ISI). ISI can cause errors in the signals as the signals transmit to an output of the receiver. To alleviate some of the ISI, equalization of the signals may be used to reduce signal distortion caused by ISI.

As noted above, equalization in digital signal processing or other solely electronic means is limited as optical communication networks increase in performance. WDEQ systems are increasingly used to provide equalization in optical waveguides as data rates of optical networks increase. Several WDEQ systems have been developed which provide the waveguide based equalization; however, the architectures of these systems may also limit performance of the optical receiver.

The methods and systems herein provide a WDEQ system which provides a delay in waveguides of the system and electrical signal summing in a differential transimpedance amplifier (TIA) which increases the performance (e.g., bandwidth, etc.) of the optical receiver.

FIG. 1 illustrates an equalizer 100, according to embodiments herein. In some examples, the equalizer 100 is implemented in a photonically-enabled/optoelectronic integrated circuit configured to transmit and/or receive and process optical signals. Integrated photonics platforms allow the full functionality of an optical transceiver to be integrated on a single chip. An optical transceiver chip contains optoelectronic circuits that create and process the optical/electrical signals on the transmitter (Tx) and the receiver (Rx) sides, as well as optical interfaces that couple the optical signals to and from a fiber. The signal processing functionality may include modulating the optical carrier, detecting the optical signal, splitting or combining data streams, and multiplexing or demultiplexing data on carriers with different wavelengths, and equalizing signals for reducing and/or eliminating ISI, which may be a common impairment in optical communication systems.

ISI may be introduced by a channel and/or the transmitter/receiver of the optical system, and can limit the maximum speed of the communication system. The equalizer 100 may be utilized to mitigate ISI, and may include waveguide delay-based equalization as described in more detail in FIGS. 2-5. Equalizers may utilize delay elements and weight elements applied to each delayed signal, which may then be summed for an equalized signal with mitigated ISI. In an example scenario, this delay may be accomplished with optical delay and weight control may be enabled through electrical and/or optical means. In an example scenario, the weighting may be implemented optically and the summing may be implemented electrically using a differential TIA, such that the resulting voltages are amplified to generate an output voltage.

In some examples, the equalizer 100 receives an input signal u(t) 120, which may represent an original clean signal that is subject to the transfer function h(t) 101 of a channel, either Tx or Rx, resulting in a signal r(t) 125 with intersymbol interference (ISI), which may occur in optical communication systems, and may limit the maximum speed of the communication system.

The equalizer 100 includes a plurality of delay elements 103a-103f, multipliers 105a-105e, weight functions 107a-107e, and a summer 109. In some examples, the equalizer 100 generates a delayed version of the original signal r(t) with unintentional ISI utilizing the plurality of delay elements 103a-103f, resulting in delayed signals s(t) 130a-130e. The delayed signals s(t) 130a-130e may each be weighted independently, with $W_N$ being either positive or negative, using the multipliers 105a-105e and weight functions 107a-107e, and then summed using the summer 109 generating an output signal v(t) 150. In some examples, the equalizer 100 may remove all ISI in a communication system, although in operation of the various elements, some ISI may not be removed due to various factors. These factors may include noise added to the system, non-linearity of the elements of the equalizer 100, variation in delay elements to the symbol period Ts, the weight $W_N$ may not be controllable or accurate, or the summation may not be accurate. Example weight, delay, and summing elements are described in more detail in relation to FIGS. 2-5.

Figure 2:
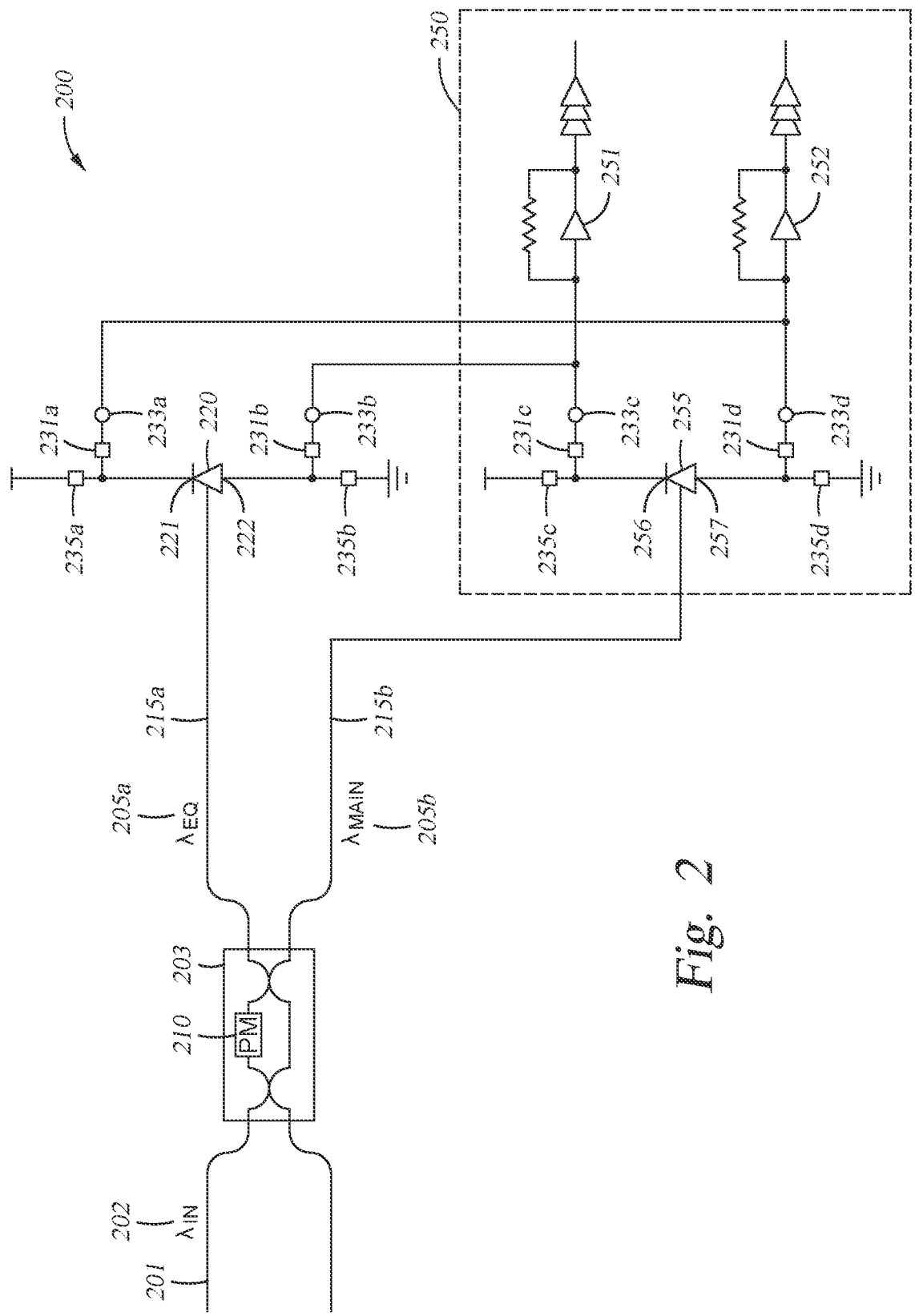
FIG. 2 illustrates signal weighting for an equalizer, according to embodiments herein.

FIG. 2 illustrates signal weighting for an equalizer 200, according to embodiments herein. The equalizer 200 includes input waveguide 201, a directional coupler 203, a waveguide 215a and a waveguide 215b, a photodiode 220 and a differential TIA 250.

In some examples, the directional coupler 203 is a stabilized directional coupler with a slightly increased length in one arm of the coupler to mitigate process variations or other causes of non-uniformity in optical coupling.

The directional coupler 203 splits the input signal $\lambda_{in}$ 202 (received via input waveguide 201) into two optical signals, signal $\lambda_{main}$ 205b and signal $\lambda_{eq}$ 205a, with reasonable precision. The directional coupler 203 may also include a phase modulator 210 including a section with p- and n-type regions adjacent to the waveguide for providing a change in dielectric constant with bias, and thus a phase change for the optical signal traveling (e.g., signal Xin 202) through the phase modulator 210. The input optical signal $\lambda_{in}$ 202, may be split by the directional coupler 203 into $\lambda_{main}$ 205b and $\lambda_{eq}$ 205a output or optical signals, where signal $\lambda_{eq}$ 205a may include a percentage X of the power of the input signal $\lambda_{in}$ 202 and signal $\lambda_{main}$ 205b includes a percentage 100-X of the input signal $\lambda_{in}$ 202. The signal $\lambda_{main}$ 205b propagates in the waveguide 215b and the signal $\lambda_{eq}$ 205a propagates in waveguide 215a. Although a single directional coupler 203 with two outputs is shown in FIG. 2, multiple directional couplers may be utilized to generate multiple output optical signals.

In some examples, the signal $\lambda_{eq}$ 205a in the waveguide 215a is converted into an electrical current signal using the photodiode 220. The waveguide 215b is directly coupled to photodiode 255 in the differential TIA 250. In some examples, the photodiodes are connected to at least two transistors. For example, the photodiode 220 is connected to a transistor 235a and a transistor 235b. The photodiode 255 is connected to a transistor 235c and a transistor 235d. In some examples, the transistors 235a and 235c are PMOS transistors and the transistors 235b and 235d are NMOS transistors. The differential TIA 250 includes a first TIA stage 251 and a second TIA stage 252. In some examples, the first TIA stage 251 and a second TIA stage 252 includes various gain stages with a feedback impedance including a resistor capacitive elements, and/or active elements, generating an output voltage proportional to the input signals received from the photodiode 220 and the photodiode 255.

In some examples, a cathode 221 of the photodiode 220 is coupled to the second TIA stage 252. An anode 257 of the photodiode 255 may also be coupled to the second TIA stage 252. Additionally, a cathode 256 of the photodiode 255 is coupled to the first TIA stage 251 and an anode 222 of the photodiode 220 is coupled to the first TIA stage 251. In some examples, an output current (i.e., the electrical signal) of the photodiode 220 is directly summed with the main signal from the photodiode 255, via the connections in the differential TIA 250. In this example, the signal $\lambda_{eq}$ 205a and the signal $\lambda_{main}$ 205b are summed in differential TIA 250. In some examples, the connections between the photodiode 220 and the photodiode 255 to the first TIA stage 251 and the second TIA stage 252 include signal pads 231a-231d and Metal-Insulator-Metal Capacitors (MIMCAPs) 233a-233d.

Figure 3A:
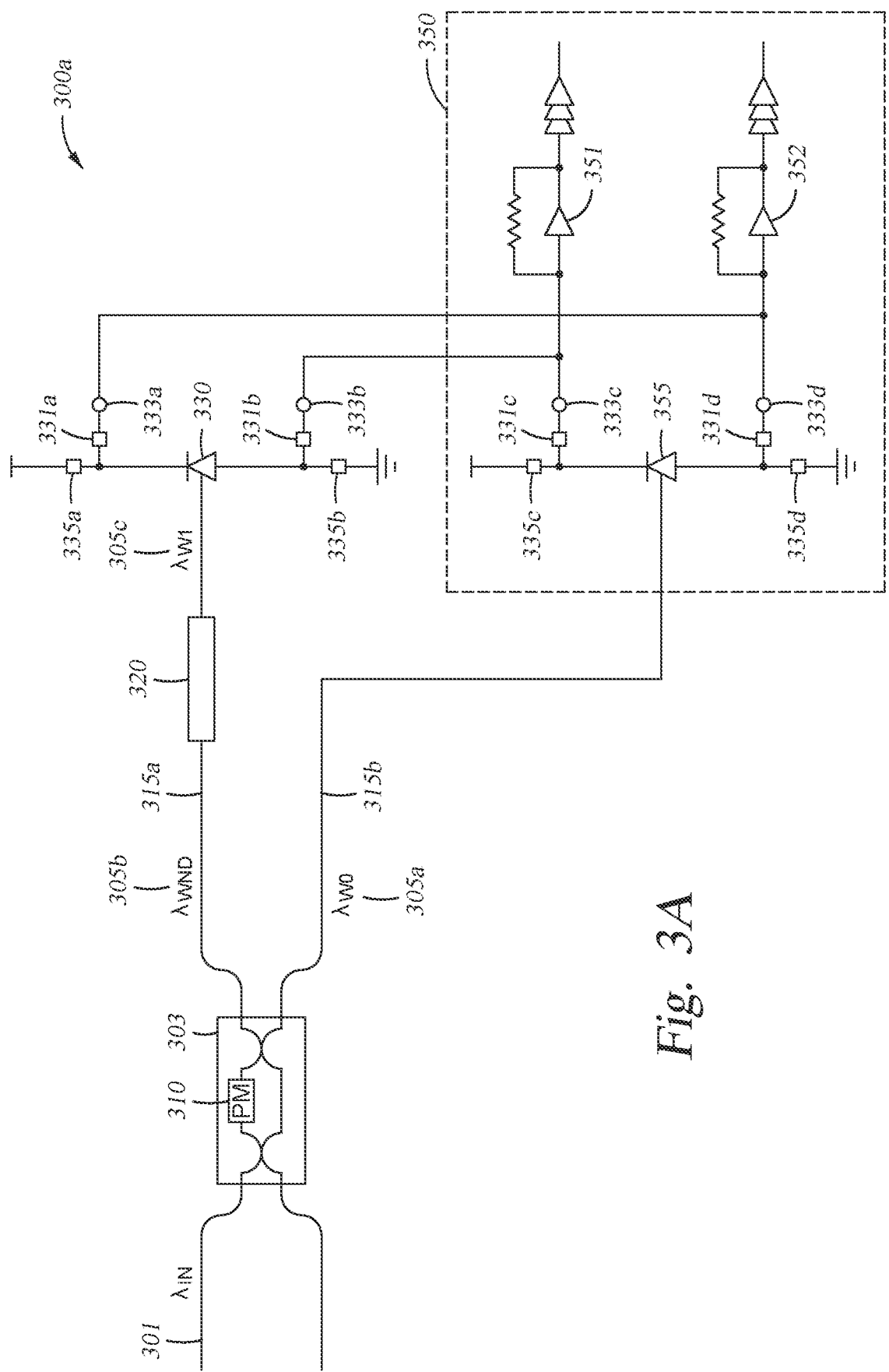
FIGS. 3A and 3B illustrate a one-tap precursor equalizer with optical and electrical weight control, according to embodiments herein.
Figure 3B:
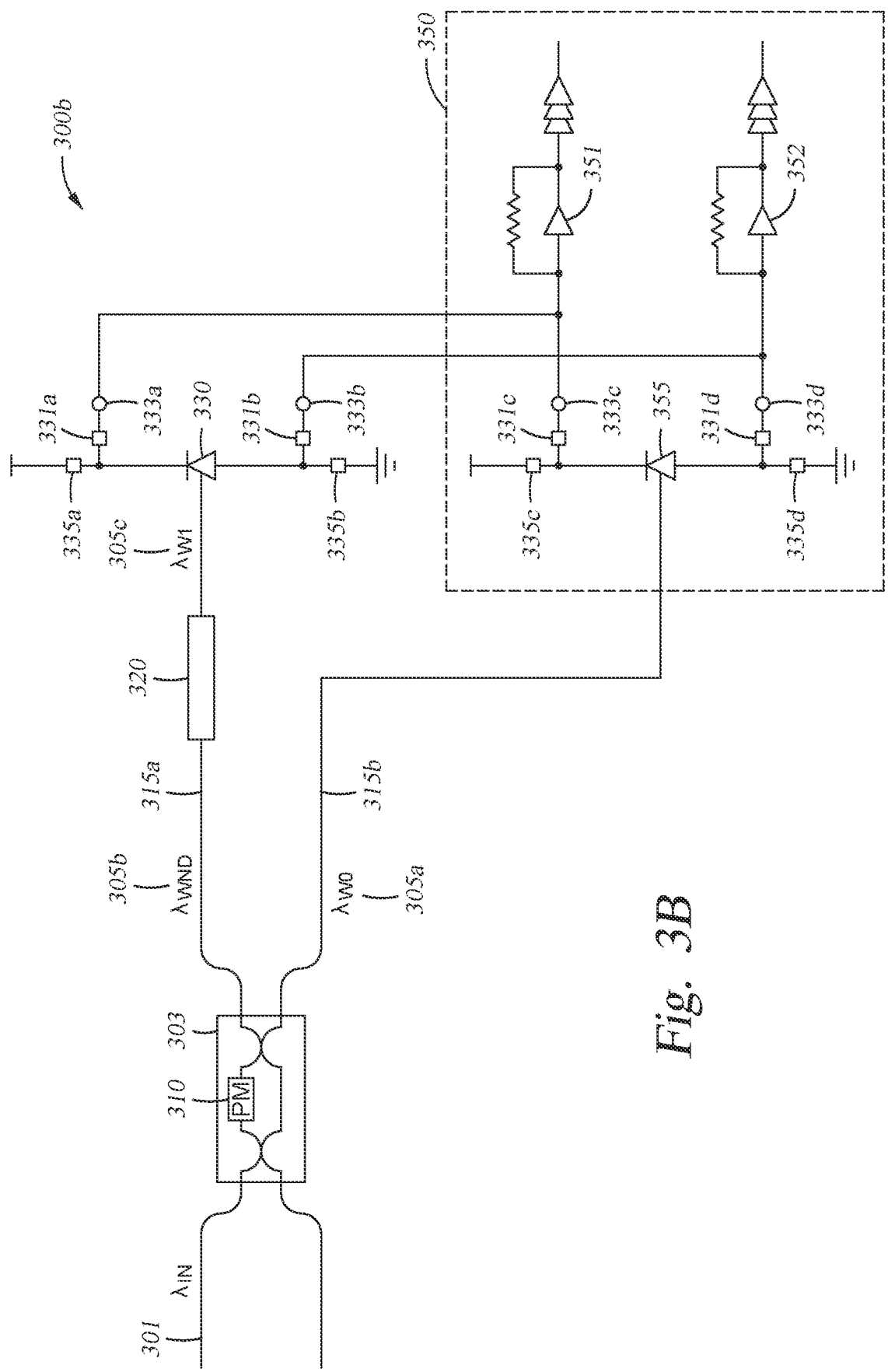

In some examples, the equalizer in optical systems also includes a waveguide as described in more detail in relation to FIG. 3A and FIG. 3B.

FIG. 3A illustrates a one-tap precursor equalizer 300a with optical and electrical weight control with a first polarity, according to embodiments herein. The equalizer 300a includes input waveguide 301, waveguides 315a and 315b, a directional coupler 303, a waveguide delay 320, photodiode 330, and a differential TIA 350.

In some examples, the waveguide delay 320 includes an appropriate length waveguide for creating an accurate delay without significant optical power loss. For example, the waveguide delay 320 may include a 0.75 mm waveguide providing for a 10 picosecond (ps) delay. In some examples, the 10 ps delay allows for 100G symbol per second signal systems.

In some examples, the equalizer 300a provides one-tap precursor equalization, with summation through current summing and weight control via the directional coupler 303 and the differential TIA 350. The weight control of the directional coupler 303 may be configurable through control of the phase modulator 310. This electro-optical weight adjustment allows high precision equalization weight optimization as part of a signal processing technique used in data recovery. For example, an eye opening may be monitored via correlation between a recovering bit and previous or next bit, and maximized by adjusting the weight of the equalization through the phase modulator 310, or other components in the equalizer 300a.

In operation, to the directional coupler 303 receives an input optical signal $\lambda_{in}$ 301 via the input waveguide 301, and portions of this input signal may be communicated to each of the waveguides 315a and 315b via the directional coupler 303. For example, the signal $\lambda_{in}$ 301 is split into main signal $\lambda_{w0}$ 305a and a signal $\lambda_{wND}$ 305b. In some examples, the splitting ratio between the signals is defined by the coupling ratios of the couplers in the directional coupler 303 and further configured by adjusting the phase modulator 310.

In some examples, the waveguide 315a couples the directional coupler 303 to the waveguide delay 320 and subsequently to the photodiode 330. The signal $\lambda_{wND}$ 305b is delayed at the waveguide delay 320, where the waveguide delay 320 produces a delayed signal $\lambda_{w1}$ 305c, coupled to the photodiode 330 via the waveguide 315a. The waveguide 315b is coupled directly to the differential TIA 350. In turn, the signal $\lambda_{w0}$ 305a traveling along the waveguide 315b is directly coupled from the directional coupler 303 to the differential TIA 350.

In some examples, the overall weight of the equalizer 300a is implemented with both optical and electronic means, where the optical means includes the optical splitting via directional coupler 303 and adjusted by phase modulator 310, with delay being provided by the waveguide delay 320.

In some examples, the delayed signal $\lambda_{w1}$ 305c in the waveguide 315a is converted into an electrical current signal using the photodiode 330. The waveguide 315b is directly coupled to a photodiode 355 in the differential TIA 350. The photodiode 330 is connected to a transistor 335a and a transistor 335b. The photodiode 355 is connected to a transistor 335c and a transistor 335d. In some examples, the transistors 335a and 335c are PMOS transistors and the transistors 335b and 335d are NMOS transistors.

The differential TIA 350 includes a first TIA component 351 and a second TIA component 352. In some examples, the first TIA component 351 and the second TIA component 352 includes various gain stages with a feedback impedance including a resistor, capacitive, and/or active elements, generating an output voltage proportional to the input signals received from the photodiode 330 and the photodiode 355. In some examples, the first TIA component 351 and the second TIA component 352 form a true and complementary stage of a differential circuit.

In some examples, a cathode of the photodiode 330 is coupled to the second TIA component 352. An anode of the photodiode 355 may also be coupled to the second TIA component 352. Additionally, a cathode of the photodiode 355 is coupled to the first TIA component 351 and an anode of the photodiode 330 is coupled to the first TIA component 351. In some examples, an output current (i.e., the electrical signal) of the photodiode 330 is directly summed with the main signal from the photodiode 355, via the connections in the differential TIA 350. In this example, the signal $\lambda_{w0}$ 305a and the signal $\lambda_{w1}$ 305c are summed in differential TIA 350 upon conversion to electrical signals. In some examples, the connections between the photodiode 330 and the photodiode 355 to the first TIA component 351 and the second TIA component 352 include signal pads 331a-331d and MIMCAPs 333a-333d.

FIG. 3B illustrates a one-tap precursor equalizer 300b with optical and electrical weight control with a second polarity, according to embodiments herein. The equalizer 300b includes input waveguide 301, waveguides 315a and 315b, a directional coupler 303, a waveguide delay 320, photodiode 330, and a differential TIA 350.

In the second polarity of the equalizer 300b, an anode of the photodiode 330 is coupled to the second TIA component 352. A cathode of the photodiode 355 may also be coupled to the second TIA component 352. Additionally, an anode of the photodiode 355 is coupled to the first TIA component 351 and a cathode of the photodiode 330 is coupled to the first TIA component 351. In some examples, an output current (i.e., the electrical signal) of the photodiode 330 is directly summed with the main signal from the photodiode 355, via the connections in the differential TIA 350. In this example, the signal $\lambda_{w0}$ 305a and the signal $\lambda_{w1}$ 305c are summed in differential TIA 350 upon conversion to electrical signals. In some examples, the connections between the photodiode 330 and the photodiode 355 to the first TIA component 351 and the second TIA component 352 include signal pads 331a-331d and MIMCAPs 333a-333d.

Figure 4:
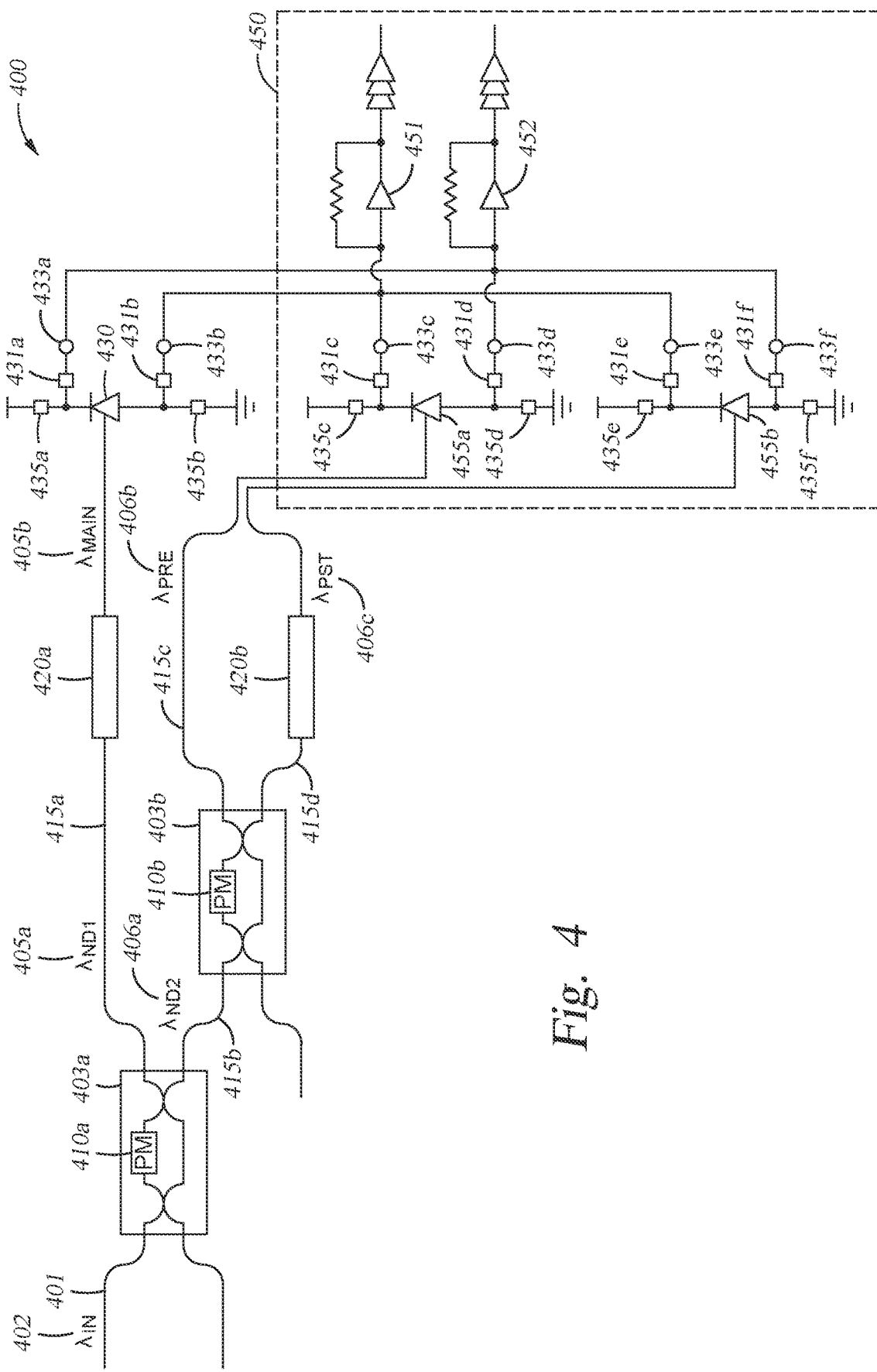
FIG. 4 illustrates a one-tap pre-cursor, one-tap post-cursor equalizer, according to embodiments herein.

While shown in a one-tap precursor equalization in FIGS. 3A and 3B, an equalizer may be implemented with more than one tap and with post cursor delays as shown in FIG. 4.

FIG. 4 illustrates a one-tap pre-cursor equalizer 400, in accordance with an example embodiment of the disclosure. The equalizer 400 includes input waveguide 401 and waveguides 415a-415d. The equalizer 400 also includes directional couplers 403a and 403a, waveguide delays 420a and 420a, a photodiode 430 and a differential TIA 450.

The directional couplers 403a and 403b, input waveguide 401 and waveguides 415a-415d, photodiode 430 may share any and all aspects of the directional couplers, waveguides, and photodiodes described with respect to FIGS. 2 and 3A and 3B. For example, the directional couplers 403a and 403b may each include a respective phase modulator 410a and 410b, where the modulators configure splitting ratios of the directional couplers 403a and 403b. In this example, a weighting of the equalizer 400 may also be configured electro-optically.

In some examples, the waveguide delays 420a and 420b may each include an appropriate length waveguide for creating an accurate delay without significant optical power loss. In some examples, a delay provided by the waveguide delay 420b is greater than a delay of the waveguide delay 420a to enable post-cursor equalization through the waveguide delay 420b.

In some examples, the directional coupled 403a receives an input optical signal $\lambda_{in}$ 401 on the input waveguide 401 and a portion of the signal $\lambda_{in}$ 402 is coupled to each of the waveguides 415a and 415b of the first directional coupler 403a, with the ratio being tuned via the phase modulator 410a. For example, the directional coupler 403a outputs signal 405a along waveguide 415a and signal 406a along output waveguide 415b.

In some examples, the waveguide 415a is coupled to waveguide delay 420a and subsequently to photodiode 430. The signal $\lambda_{ND1}$ 405a is delayed at the waveguide delay 420a, where the waveguide delay 420a produces a delayed signal $\lambda_{main}$ 405b, coupled to the photodiode 430 via the waveguide 415a. The other output waveguide 415b may be coupled to second directional coupler 403b with phase modulator 410b for configuring the splitting ratio. An output of second directional coupler 403b may be directly coupled to differential TIA 450 via waveguides 415c. Another output of the directional coupler 403b may be coupled to the second waveguide delay 420b via waveguide 415d, which is subsequently directly coupled to the differential TIA 450. In some examples, the differential TIA 450 includes a photodiode 455a which is coupled to the waveguide 415c and a photodiode 455b which is coupled to the waveguides 415d. In some examples, the photodiode 455a receives signal $\lambda_{pre}$ from the directional coupler 403b and the photodiode 455b receives $\lambda_{pst\ from}$ the waveguide delay 420b.

Additionally, the photodiode 430 is connected to a transistor 435a and a transistor 435b. The photodiode 455a is connected to a transistor 435c and a transistor 435d. The photodiode 455b is connected to a transistor 435e and a transistor 435f. In some examples, the transistors 435a, 435c, and 435e PMOS transistors and the transistors 435b, 435d, and 435f are NMOS transistors.

In some examples, the delayed signal $\lambda_{main}$ 405b in the waveguide 415a is converted into an electrical current signal using the photodiode 430. The differential TIA 450 includes a first TIA component 451 and a second TIA component 452. In some examples, the first TIA component 451 and a second TIA component 452 includes various gain stages with a feedback impedance including a resistor, capacitive, and/or active elements, generating an output voltage proportional to the input signals received from the photodiode 430 and the photodiodes 455a and 455b.

In some examples, a cathode of the photodiode 430 is coupled to the second TIA component 452. An anode of the photodiode 455a and an anode of the photodiode 455b may also be coupled to the second TIA component 452. Additionally, a cathode of the photodiode 455a and a cathode of the photodiode 455b is coupled to the first TIA component 451 and an anode of the photodiode 430 is coupled to the first TIA component 451. In some examples, an output current (i.e., the electrical signal) of the photodiode 430 is directly summed with the signal represent the summed signals, the signal $\lambda_{pre}$ 406b and the signal $\lambda_{pst}$ 406c from the photodiode 455b, via the connections in the differential TIA 450.

In some examples, the equalizer 400 is shown in first polarity. In another example, the equalizer 400 may have a reverse polarity similar to the equalizer 300b shown in FIG. 3B.

In equalizer 400, the signal the signal $\lambda_{main}$ 405b signals signal and signals $\lambda_{pre}$ 406b and signal $\lambda_{pst}$ 406c are summed in differential TIA 450 upon conversion to electrical signals. In some examples, the connections between the photodiode 430 and the photodiode 455 to the first TIA component 451 and the second TIA component 452 include signal pads 431a-431f and MIMCAPs 433a-433f. In some examples, the one-tap pre-cursor equalizer 400 may achieve multi-tap equalization with a single photodiode and differential TIA and may be extended to additional equalization steps if desired For example, further directional couplers may be incorporated with additional delay lines, photodetectors, and differential TIAs for each additional tap, as illustrated by the multi-tap equalizer schematic in FIG. 1.

Figure 5:
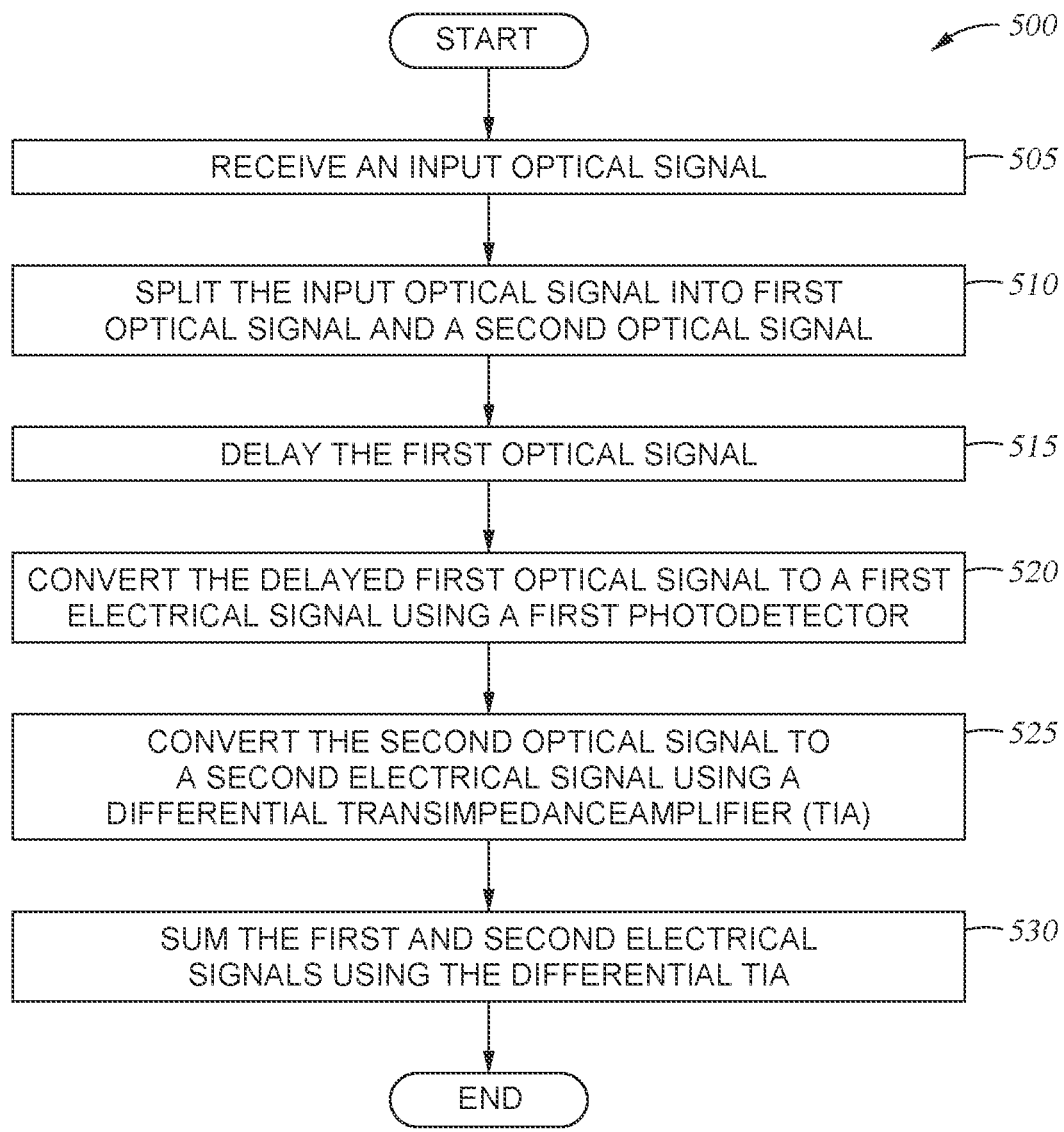
FIG. 5 is a method for waveguide delay based equalization, according to embodiments herein.

FIG. 5 is a method 500 for waveguide delay based equalization, according to embodiments herein. For ease of discussion, reference is made to FIGS. 2, 3A, 3B, and 4 above during the discussion of method 500. Any of the optoelectronic circuits described in FIGS. 2, 3A, 3B, and 4 are operable to perform the operations of the method 500. The method 500 begins at block 505 where an equalizer, such as any of the equalizers described in FIGS. 2-4, receive an input optical signal.

At block 510, the equalizer splits the input optical signal into first optical signal and a second optical signal. In some examples, the input optical signal is split using a directional coupler such as the directional coupler 303 and directional coupler 403a. In some examples, the equalizer splits the second optical signal into a third optical signal and a fourth optical signal using a second directional coupler before generating the second electrical signal. For example, the second optical signal is split using the directional coupler 403b into a third and fourth optical signal.

At block 515, the equalizer delays the first optical signal. In some examples, delaying the first optical signal includes using a waveguide delay, such as waveguide delays 320 and 420a to delay the signal. In some examples, the waveguide delay is coupled to an output of a directional coupler by a waveguide such as the waveguides 315a and 415a. In some examples, the equalizer delays the fourth optical signal using a waveguide delay, such as the waveguide delay 420b. In another example, such described in relation to the equalizer 200, the equalizer does not delay the first optical signal and the first photodetector is coupled directly to the directional coupled.

At block 520, the equalizer converts the delayed first optical signal to a first electrical signal using a first photodetector. In some examples, the first photodetector is a photodiode such as the photodiodes 330 and 430. At block 525, the equalizer converts the second optical signal to a second electrical signal using a differential TIA. In some examples, the differential TIA includes a photodiode, such as the photodiodes 355, 455a, and 455b to convert the second optical signal to the second electrical signal.

At block 530, the equalizer sums the first and second electrical signals using the differential TIA. In some examples, an anode from the first photodetector is connected to a first component of the differential TIA, and a cathode of the first photodetector is connected to a second component of the differential TIA. The differential TIA combines the signals received via these connections to sum the first and second electrical signals.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

What is claimed is:

1. A method comprising:
receiving an input optical signal;
splitting the input optical signal into a first optical signal and a second optical signal;
delaying the first optical signal;
converting the delayed first optical signal to a first electrical signal using a first photodetector and at least two transistors connected to the first photodetector;
converting the second optical signal to a second electrical signal using a second photodetector and at least two transistors connected to the second photodetector and a differential transimpedance amplifier (TIA); and
summing the first and second electrical signals using the differential TIA.

2. The method according to claim 1, comprising delaying the first optical signal using a waveguide delay.

3. The method according to claim 2, wherein the waveguide delay is coupled to an output of a directional coupler.

4. The method according to claim 1, wherein the first photodetector comprises a first photodiode, wherein the at least two transistors connected to the first photodetector comprise a first NMOS transistor and a first PMOS transistor, and wherein the second photodetector comprises a second photodiode to convert the second optical signal to the second electrical signal, wherein the at least two transistors connected to the second photodetector comprise a second NMOS transistor and a second PMOS transistor.

5. The method according to claim 4, wherein:
an anode from the first photodiode is connected to a first stage of the differential TIA,
a cathode of the first photodiode is connected to a second stage of the differential TIA, an anode from the second photodiode is connected to the second stage of the differential TIA, and a cathode of the second photodiode is connected to the first stage of the differential TIA.

6. The method of claim 5, wherein each connection between the first photodiode and the first stage and the second stage comprises a signal pad and a Metal-Insulator-Metal Capacitor, and wherein each connection between the second photodiode and the first stage and the second stage comprises a signal pad and a Metal-Insulator-Metal Capacitor.

7. The method according to claim 1, comprising splitting the second optical signal into a third optical signal and a fourth optical signal using a second directional coupler before generating the second electrical signal.

8. The method according to claim 7, further comprising: delaying the fourth optical signal; and
coupling the delayed fourth optical signal and the third optical signal to the differential TIA.

9. A system for communication, the system comprising:
an optoelectronic circuit comprising a directional coupler, a first photodetector, at least two transistors connected to the first photodetector, an optical delay, and a differential transimpedance amplifier (TIA), the optoelectronic circuit being operable to:
receive an input optical signal;
split the input optical signal into a first optical signal and a second optical signal via the directional coupler;
delay the first optical signal via the optical delay;
convert the delayed first optical signal to a first electrical signal using the first photodetector;
convert the second optical signal to a second electrical signal using a second photodetector with at least two transistors connected to the second photodetector and the differential TIA; and
sum the first and second electrical signals using the differential TIA.

10. The system of claim 9, wherein the optical delay comprises a waveguide delay.

11. The system of claim 10, wherein the waveguide delay is coupled to an output of the directional coupler.

12. The system of claim 10, wherein the first photodetector comprises a first photodiode, wherein the at least two transistors connected to the first photodetector comprise a first NMOS transistor and a first PMOS transistor, and wherein the second photodetector comprises a second photodiode to convert the second optical signal to the second electrical signal, wherein the at least two transistors connected to the second photodetector comprise a second NMOS transistor and a second PMOS transistor.

13. The system of claim 12, wherein:
an anode from the first photodiode is connected to a first stage of the differential TIA, a cathode of the first photodiode is connected to a second stage of the differential TIA, an anode from the second photodiode is connected to the second stage of the differential TIA, and a cathode of the second photodiode is connected to the first stage of the differential TIA.

14. The system of claim 13, wherein each connection between the first photodiode and the first stage and the second stage comprises a signal pad and a Metal-Insulator-Metal Capacitor, and wherein each connection between the second photodiode and the first stage and the second stage comprises a signal pad and a Metal-Insulator-Metal Capacitor.

15. The system of claim 9, the optoelectronic circuit being further operable to:
split the second optical signal into a third optical signal and a fourth optical signal using a second directional coupler before generating the second electrical signal.

16. The system of claim 15, the optoelectronic circuit being further operable to:
delay the fourth optical signal via a second optical delay; and
wherein the delayed fourth optical signal and the third optical signal are coupled to the differential TIA.

17. A method comprising:
receiving an input optical signal;
splitting the input optical signal into a first optical signal and a second optical signal;
converting the first optical signal to a first electrical signal using a first photodetector with at least two transistors connected to the first photodetector;
converting the second optical signal to a second electrical signal using a second photodetector with at least two transistors connected to the second photodetector and a differential transimpedance amplifier (TIA); and
summing the first and second electrical signals using the differential TIA.

18. The method according to claim 17, wherein the first photodetector is coupled to an output of a directional coupler.

19. The method according to claim 17, wherein the first photodetector comprises a first photodiode, wherein the at least two transistors connected to the first photodetector comprise a first NMOS transistor and a first PMOS transistor, and wherein the second photodetector comprises a second photodiode to convert the second optical signal to the second electrical signal, wherein the at least two transistors connected to the second photodetector comprise a second NMOS transistor and a second PMOS transistor.

20. The method according to claim 17, wherein an anode from the first photodetector is connected to a first stage of the differential TIA, and a cathode of the first photodetector is connected to a second stage of the differential TIA.

* * * * *